US010822093B2

(12) United States Patent
Gross et al.

(10) Patent No.: US 10,822,093 B2
(45) Date of Patent: Nov. 3, 2020

(54) ADAPTER RAIL SYSTEM AND METHOD FOR MOUNTING AN OBJECT TO A FLOOR RAIL IN A TRANSPORTATION SYSTEM

(71) Applicant: AIRBUS OPERATIONS GMBH, Hamburg (DE)

(72) Inventors: Claus-Peter Gross, Hamburg (DE); Lars Schomacker, Hamburg (DE); Sven Jansen, Hamburg (DE); Patrick Rollfink, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 101 days.

(21) Appl. No.: 15/944,006

(22) Filed: Apr. 3, 2018

(65) Prior Publication Data
US 2018/0222593 A1 Aug. 9, 2018

Related U.S. Application Data

(63) Continuation of application No. PCT/EP2016/074780, filed on Oct. 14, 2016.

(30) Foreign Application Priority Data

Oct. 16, 2015 (DE) .................... 10 2015 117 709

(51) Int. Cl.
*B64D 11/06* (2006.01)
*B60N 2/07* (2006.01)
(Continued)

(52) U.S. Cl.
CPC .......... *B64D 11/0696* (2013.01); *B60N 2/015* (2013.01); *B60N 2/01525* (2013.01);
(Continued)

(58) Field of Classification Search
CPC .............. B64D 11/0696; B60N 2/0715; B60N 2/0725; B60P 7/0815
(Continued)

(56) References Cited

U.S. PATENT DOCUMENTS 4,230,432 A * 10/1980 Howell ................. B60P 7/0815
248/503.1
5,520,357 A * 5/1996 Payne .................. B61D 45/006
244/118.1
(Continued)

FOREIGN PATENT DOCUMENTS

DE 10337746 A1 3/2005
DE 202005000134 U1 6/2005
(Continued)

*Primary Examiner* — Hilary L Gutman
(74) *Attorney, Agent, or Firm* — Greer, Burns & Crain, Ltd.

(57) ABSTRACT

An adapter rail system for mounting objects to a floor rail in a vehicle includes an elongate adapter rail element, an arresting element and a movement rail element. The adapter rail element has a surface contour having regularly consecutively arranged neckings and widenings, which surface contour corresponds to an opening contour of a floor rail, which includes regularly consecutively arranged grid openings, which are penetrated by a slit. The adapter rail element has protrusions extending perpendicular to the plane spanned by the surface contour and are each arranged in the region of a necking. The arresting element has a surface contour corresponding to the opening contour of at least one grid opening. The arresting element is dimensioned to be flush between two adjacent protrusions of the adapter rail element onto the adapter rail element. The movement rail element is connectable with the protrusions of the adapter rail element.

7 Claims, 5 Drawing Sheets

(51) Int. Cl.
B60N 2/015 (2006.01)
*B60P 7/08* (2006.01)

(52) U.S. Cl.
CPC ......... B60N 2/0715 (2013.01); B60N 2/0725 (2013.01); *B60P 7/0815* (2013.01)

(58) Field of Classification Search
USPC ........................................ 410/105, 115, 116
See application file for complete search history.

(56) References Cited

U.S. PATENT DOCUMENTS

| | | | | |
|---|---|---|---|---|
| 5,871,318 | A * | 2/1999 | Dixon | B60N 2/01558 244/118.1 |
| 6,260,813 | B1 * | 7/2001 | Whitcomb | B64D 11/0696 244/118.6 |
| 7,861,996 | B2 * | 1/2011 | Ponzo De Siqueira | B64D 11/0696 244/118.6 |
| 8,182,183 | B2 * | 5/2012 | Cook | B60N 2/01558 244/118.1 |
| 10,259,585 | B2 * | 4/2019 | Sodore | B64D 11/0696 |
| 2007/0063122 | A1 * | 3/2007 | Bowd | B64C 1/20 248/429 |
| 2009/0230241 | A1 * | 9/2009 | Heller | B60P 7/0815 244/118.1 |
| 2010/0025557 | A1 * | 2/2010 | Ponzo De Siqueira | B64C 1/20 248/503.1 |
| 2010/0116933 | A1 * | 5/2010 | Erickson | B64C 1/20 244/118.5 |
| 2010/0124457 | A1 | 5/2010 | Cook et al. | |
| 2015/0192162 | A1 | 7/2015 | Jones | |
| 2018/0222593 | A1 | 8/2018 | Gross et al. | |

FOREIGN PATENT DOCUMENTS

| | | |
|---|---|---|
| DE | 102009004987 A1 | 7/2010 |
| DE | 102011013689 A1 | 9/2011 |
| DE | 102010037754 A1 * | 3/2012 ............ B60P 7/0815 |
| DE | 102103103662 A1 | 10/2014 |

* cited by examiner

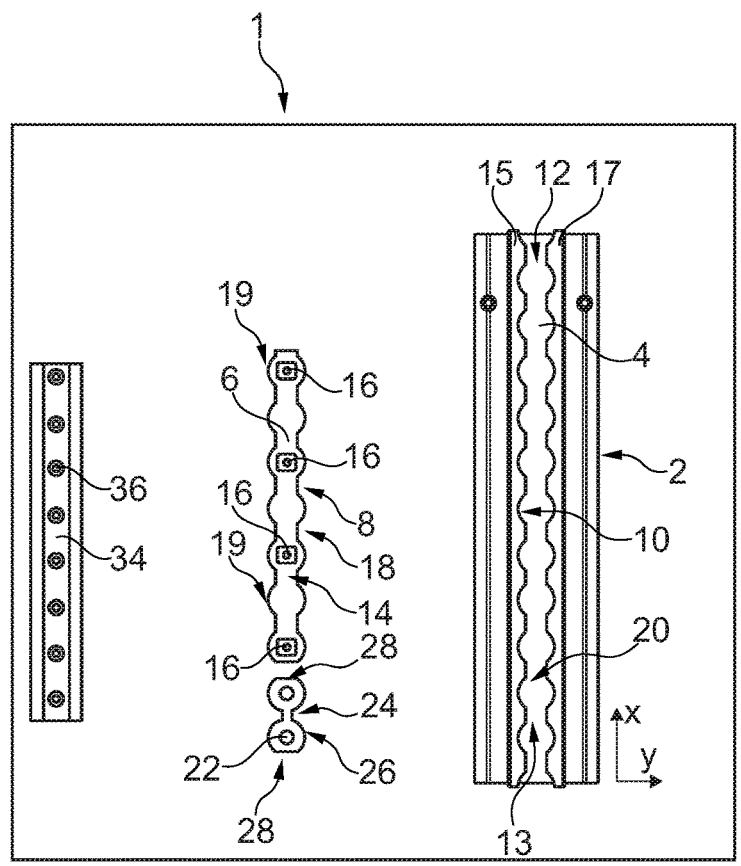
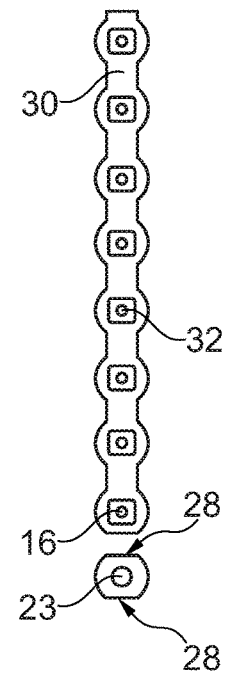
Fig. 1a
Fig. 1b
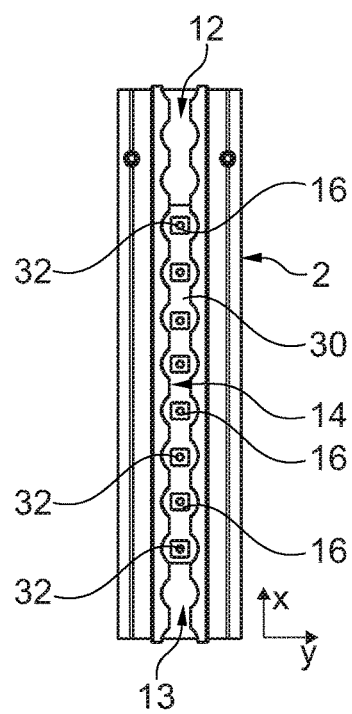
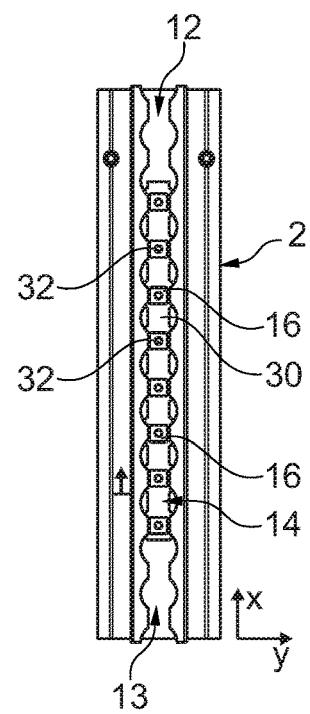
Fig. 2
Fig. 3

ADAPTER RAIL SYSTEM AND METHOD FOR MOUNTING AN OBJECT TO A FLOOR RAIL IN A TRANSPORTATION SYSTEM

CROSS-REFERENCE TO PRIORITY APPLICATIONS

This application is a continuation of international patent application number PCT/EP2016/074780, having an international filing date of Oct. 14, 2016, which claims priority to German patent application number DE 102015117709.9, having a filing date of Oct. 16, 2015. The content of the referenced applications is incorporated by reference herein.

TECHNICAL FIELD

Embodiments of the invention relate to an adapter rail system for mounting an object to a floor rail in a transportation means, a method for mounting an object to a floor rail of a transportation means as well as a transportation means having at least one floor rail and at least one object, which is mounted to a floor rail through an adapter rail system.

BACKGROUND

Transportation means (a system, assembly, component, vehicle, or the like), which serve the transport of passengers, usually comprise floor rails for mounting of passenger seats and other installations, which floor rails comprise fastening means arranged in a certain grid. Different mounting positions on the floor rails may be realized through using the grid, wherein the mounting of the respective object at the desired position is usually accomplished through an arresting device, which conducts a form-fit and/or force-fit arresting with the fastening of the floor rail.

Furthermore, it is known to determine the distance between seats arranged one behind the other in a longitudinal direction particularly in aircraft and, if required, to change it occasionally or regularly depending on the desire or temporary demand. For this purpose, correspondent arresting devices of the respective seats are released and, subsequently, the seats are displaced along the floor rail, whereinafter the arresting devices are closed again. Through changing the distance particularly between two passenger seats, the seating class of the respective section in the passenger cabin may be changed.

For arresting of a passenger seat on a floor rail, a plurality of different arresting devices is known. These are often based on the clamping to shape features of the floor rail by means of movable, mushroom-shaped elements. For moving of passenger seats along seat rails, automatable devices with an electrical drive are known.

DE 10 2009 004 987 B4 exemplarily shows a slidable seat for a transportation means having a seat frame for displaceable attachment to a support structure of the transportation means, wherein the seat is configured such that two such successively arranged seats in the transportation means in a collapsed state have a smaller common base surface than in a pushed-apart state of use.

DE 10 2013 103 662 A1 shows a holding apparatus for fixing passenger seats in a transportation means, which comprises a seat leg fixation element, a gliding element and a rail element.

During the conception of movably arranged seats and other installation components, the use of a gliding rail may be feasible, the mounting of which on a floor rail using known systems is cumbersome, in particular when retrofitting to already existing floor rails.

BRIEF SUMMARY

It may resultantly be considered an object of the disclosure to propose a floor rail or a gliding rail arrangement, which allows an as simple as possible change of the position of objects arranged thereon, wherein a special attention should be directed to a simple retrofit, such that such a solution is efficiently deployable in already existing and operating transportation means.

This object is met by an adapter rail system having the features of independent claim 1. Advantageous embodiments and further improvements may be gathered from the sub-claims and the following description.

It is proposed an adapter rail system for mounting objects on a floor rail in a transportation means, which comprises at least one elongate adapter rail element, at least one arresting element and at least one movement rail element. The adapter rail element comprises a surface contour having regularly consecutively arranged neckings and widenings, which surface contour corresponds to an opening contour of a floor rail, which comprises regularly consecutively arranged grid openings, which are penetrated by a slit. The adapter rail element further comprises protrusions, which substantially extend perpendicular to the plane spanned up by the surface contour and are each arranged in the region of a necking. The arresting element comprises a surface contour, which corresponds to the opening contour of at least one grid opening of the floor rail, and which arresting element is dimensioned to be flushly layable between two adjacent protrusions of the adapter rail element onto the adapter rail element. The movement rail element is connectable with the protrusions of the at least one adapter rail element.

The floor rail comprises an elongate extension and exemplarily includes a flat, belt-like base, on which two projections are present at a distance to each other and separated by a slit, which projections together with the base enclose a hollow space. Furthermore, the slit is penetrated by grid openings distributed along the floor rail, which grid openings are at a predetermined distance to each other, which usually is 1 inch, through which grid openings extend through the projections. Usually, the grid openings serve for introducing mushroom-shaped arresting elements of an arresting device, which is arranged on the projections, into the hollow space, to displace them between two adjacent grid openings into a narrowing region with a low local distance of both projections and to clamp them onto the projections through the action of a force.

According to said features, the adapter rail element comprises an outer shape, which allows inserting the adapter rail element into the hollow space of such a floor rail through an opening contour facing into the cabin of the transportation means. The adapter rail element may therefore comprise a flat type of construction, which has a surface contour corresponding to the floor rail and comprises a height, which reaches the height of the hollow space of the floor rail at a maximum, but is preferably slightly lower. The length should not exceed a handleable length of 1 m and preferably 0.5 m. Due to the regular arrangement of grid openings in a slit of the floor rail the surface contour of the adapter rail element comprises a regular arrangement of widenings and neckings arranged therebetween. The shape of the widenings corresponds to the shape of the grid openings and the neckings correspond to the slit of the floor rail at their narrowest locations. The arresting element is shaped in a very similar manner, but preferably comprises a lower length.

An adapter rail element inserted into the floor rail may be displaced within the floor rail due to its type of construction. Resultantly, the positioning of the adapter rail element may be conducted through inserting it at a first location and through displacing it to a second location within the floor rail subsequently and, thereby, within the respective cabin.

The movement rail element is an elongate element, which at least partially encloses a slider or is at least partially enclosed by a slider, such that it is guided along the movement rail element. The movement rail element may be realized with an arbitrary length through connecting further movement rail elements, such that a movement rail may be created, which extends along a cabin completely. The movement rail element may be a gliding rail or a roller track, wherein also sliders comprising roller bearings may be used on a gliding rail.

The adapter rail and the movement rail element to be arranged thereon may remain in a fixed position, if the adapter rail element is displaced about half a grid length relative to the grid openings in the floor rail after insertion into the hollow space, such that the widenings of the adapter rail element are positioned underneath of neckings of the floor rail. Subsequently, the arresting element may be placed onto the use surface of the adapter rail element through the grid openings in the floor rail, such that a surface contact between the protrusions of the adapter rail element and end edges of the arresting element is created and that the arresting element is held in the opening contour of the floor rail due to its shape and the placement on the adapter rail element.

Due to the surface contact between the protrusions and the arresting element, the adapter rail element consequently cannot be displaced within the hollow space any more. Furthermore, due to the displaced position, it cannot slip out of the opening contour of the floor rail any more.

Furthermore, due to connecting the movement rail element and the adapter rail element, the arresting elements are held between the adapter rail element and the movement rail element and cannot slip out unintentionally. Thereby, a safe fixation of the movement rail element in all spatial directions is accomplished. Subsequently, the slider may be attached or the object may be attached to the slider, respectively.

Preferably, the adapter rail system comprises at least one slider supportable in a gliding manner on the movement rail element, onto which slider objects are mountable. The slider comprises a recess, through which recess the movement rail element extends for a displaceable support. The profile of the movement rail element and of the recess are thus adapted to each other, wherein one of the profiles preferably comprises at least one undercut laterally directed outwards from the movement rail element, which prevents lifting of the slider from the movement rail element perpendicular to a main extension direction of the movement rail element. A design of the respective profiles as realized in a dovetail guide suggests itself.

It is conceivable that the slider is arranged on the movement rail element already before fastening the movement rail element. Through the chosen length of the adapter rail element, a particular harmonic force introduction from the object mounted on the slider into the floor rail may be accomplished.

The adapter rail system according to the disclosure allows a simple yet effective and efficient mounting of a movement rail on an existing floor rail, both during manufacturing of a transportation means and in form of a later, retrofitted movement rail. The individual adapter rail elements are well handleable; due to a chosen length, which particularly equals 7 or 8 grid openings in a common floor rail, also a very good force introduction into the floor rail is possible. The limited length may be used for introducing a particularly low additional weight into the structure of the transportation means, since the adapter rail elements may be inserted in places within the cabin where necessary, whereas gaps between individual adapter rail elements are possible and advantageous.

In a particularly advantageous embodiment, the adapter rail element comprises a length, which corresponds to at least two grid openings of the floor rail. Particularly preferred the adapter rail element comprises a length, which corresponds to 25 grid openings at a maximum, preferably to not more than 12 and particularly preferred to not more than 8 grid openings. Such a length is very well handleable particularly with floor rails having a grid distance or a grid length, respectively, of one inch, it allows a very good force introduction into the floor rail and furthermore limits the additional weight, since adapter rail elements are only needed to be inserted at places within the cabin, at which they are required. Introducing such adapter rail elements with a relatively small format into floor rails already present is thus very simple and may be conducted by a single person quickly.

The protrusions preferably comprise a width, which is substantially equal to the width of a slit in the floor rail or less. Displacing the adapter rail element with a protrusion arranged thereon is thus possible without further ado. Through choosing the width of the protrusion it is furthermore ensured that a precise positioning transverse to the extension axis of the floor rail is possible.

The respective object may selectively be arrested through devices arranged on the movement rail element by means of the slider selectively.

In another embodiment, the arresting element may be fixedly arranged on an underside of the movement rail element. Hence, it is not necessary to actively place one or a plurality of separate arresting elements onto the adapter rail element for locking the adapter rail element to the floor rail. After the adapter rail is inserted into the hollow space through the opening contour of the floor rail it may be displaced inside the hollow space to adjust the positions of the protrusions relative to the narrowings of the opening contour. Once the positions of the protrusions are as desired, the movement rail element or a plurality thereof may be placed on the floor rail. The arresting elements, which are arranged on an underside of the respective movement rail element will then be inserted into the opening contour until the underside of the respective movement rail element rests on the upper side of the floor rail flushly. Then, the arresting elements provide a form-fit with the opening contour of the floor rail. Through connecting the adapter rail element with the movement rail element a further locking in a vertical direction is accomplished. Resultantly, neither the adapter rail element nor the movement rail element can move along the extension of the floor rail.

The arresting element may be realized as a set of arresting bodies, which are arranged on an underside of the movement rail element. They may be attached to the movement rail element through any form-, force- or material-fit connection. Also, they may be integrally formed when the movement rail element is manufactured.

Still further, the arresting element may be realized as at least one pair of arresting bodies having a base surface in the form of a segment of a circle. Resultantly, these arresting bodies are crescent-shaped or lunate, respectively. Their outer dimensions are adapted to the opening contour of the floor rail, i.e. the diameter of the grid openings.

The adapter rail system may further comprise a floor rail which is integratable into a floor of a passenger cabin of a transportation means.

Still further, the floor rail may comprise a flat upper receiving surface, which is penetrated by the grid openings and the slit. Consequently, the advantage of such a floor rail lies in providing the least possible extension of the floor rail into the interior of the cabin. The height including the movement rail attached to the upper surface is as low as possible as well and may preferably be the same as the height of a common floor rail without an added movement rail element.

The disclosure further relates to a method for mounting an object in a transportation means comprising the steps of inserting an elongate adapter rail element into an opening contour of a floor rail of the transportation means, wherein the adapter rail element comprises a surface contour having regularly consecutively arranged neckings and widenings, which correspond to the opening contour of a floor rail, which comprises regularly consecutively arranged grid openings, which are penetrated by a slit; displacing of the adapter rail element about half a grid length within the floor rail; laying of at least one arresting element into the opening contour of the floor rail onto the adapter rail element between two adjacent protrusions of the adapter rail elements, which substantially extend perpendicular to the plane spanned up by the surface contour and are each arranged in the region of a necking; laying of at least one movement rail element onto the floor rail; and connecting of the at least one movement rail element with protrusions of the adapter rail element and arranging of a slider onto the at least one movement rail element.

Advantageously, the method additionally comprises connecting an object with a slider and arresting the slider on the at least one movement rail element.

The disclosure further relates to a transportation means, particularly an aircraft, having a cabin with floor rails as well as an adapter rail system described above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of the exemplary embodiments illustrated in the figures. In this respect, all described and/or graphically illustrated characteristics also form the object of the disclosure individually and in arbitrary combination regardless of their composition in the individual claims or their references to other claims. Furthermore, identical or similar objects are identified by the same reference symbols in the figures.

FIG. 1a shows a floor rail besides an adapter rail element and an arresting element.

FIG. 1b shows an alternative embodiment of an adapter rail element and an arresting element fitting therewith.

FIG. 2 shows an adapter rail element inserted into a floor rail.

FIG. 3 shows the adapter rail element displaced within the floor rail.

DETAILED DESCRIPTION

Figure 4:
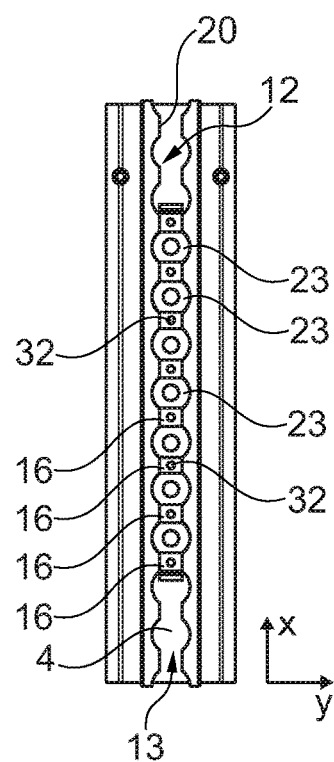
FIG. 4 shows a combination of a floor rail, an inserted adapter rail element and an arresting element.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

FIG. 1 shows an adapter rail system 1 for a floor rail 2 having a number of grid openings 4, which are distributed along a longitudinal axis x in predetermined distances relative to each other along the floor rail 2. The adapter rail system 1 includes an adapter rail element 6, an arresting element 22 and a movement rail 34, wherein the number of all included components is of course variable and adaptable on demand.

A first variant of the adapter rail element 6 comprises a flat, belt-like shape having a surface contour 8, which corresponds to an opening contour 10 of the openings 4. The adapter rail element 6 is exemplarily designed in a manner that the surface contour 8 corresponds to exactly seven grid openings 4, such that the adapter rail element 6 arrives in a hollow space 12 of the floor rail 2 through insertion into seven neighboring grid openings 4 at the same time. The hollow space 12 is created through projections 15 and 17 arranged opposite each other.

The visible surface 14, which lies in the drawing plane in FIG. 1, is to be considered a use side or use surface, respectively, as it faces the movement rail, which is to be attached thereon. A plurality of protrusions 16, which are arranged at a distance to each other and which substantially perpendicularly extend from the surface 14 are arranged on the surface 14, which protrusions protrude through the opening contour 10 to an exterior of the floor rail 2 when the adapter rail element 6 is located within the floor rail 2, such that the movement rail element 34 may be mounted thereto, exemplarily through screwing. Resultantly, the height of the adapter rail element 6 is to be adapted to the height of the hollow space 12 inside the floor rail 2, by neglecting the protrusions 16. Exemplarily, the protrusions are arranged in a region of the widenings 19, wherein between two widenings 19 that carry a protrusion 16, a widening 19 is positioned, which does not comprise a protrusion 16.

For ensuring the above described function the adapter rail element 6 comprises neckings 18, which are at a distance to each other and regularly arranged along a main extension direction, which may coincide with a longitudinal axis x in an aircraft cabin, if the adapter rail element lays inside the floor rail 2, which neckings correspond to narrowings 20 between individual grid openings 4 of the floor rail 2. Widenings 19 are located between the neckings 18 and are regularly arranged at a distance to each other and correspond to the grids openings 4 of the floor rail 2 itself. The opening clearance of a narrowing 20 is determined through a slit 13, which is exemplarily placed at a center of the floor rail 2 and penetrated by the grid openings 4, which slit determines the distance between the projections 15 and 17 in the main extension axis of the floor rail 2.

The arresting element 22 also comprises a flat shape that is limited through a surface contour 24, which also corresponds to the opening contour 10 of the floor rail 2. In the example shown the arresting element 22 is dimensioned in a way that it corresponds to two grid openings 4 and thus comprises a single necking 26, which corresponds to a single narrowing 20 between two grid openings 4 of the floor rail 2. The arresting element 22 comprises two straight end edges 28 located opposite each other, which are contactable with two surfaces of two adjacent protrusions 16 of the adapter rail element 6, with the two surfaces facing each other, such that the arresting element 22 is positioned flushly between the protrusions. Of course an arresting element 22 may comprise differently shaped end edges 28, which exemplarily curve outwards or inwards, wherein the protrusions 16 should be shaped to correspond thereto.

The arresting element 22 is placed onto the adapter rail element 6, when it is displaced about half a grid length relative to the floor rail 2. The grid length thereby equals the interval length of the grid openings 4 of the floor rail 2, i.e. exemplarily the distance between the centers of two adjacent grid openings 4.

FIG. 1b shows an alternate adapter rail element 30, which comprises a length that exemplarily corresponds to eight grid openings 4 and which comprises eight protrusions 16 in total, which each are arranged in the region of a widening 19. Exemplarily all widenings 19 are equipped with a protrusion 16 in this manner. Fittingly to this, an arresting element 23 comprises a relatively small length, which corresponds to merely a single grid opening 4. The end edges 28 are equal to those of the arresting element 22 and are straight in the chosen illustration, too.

FIG. 2 shows the floor rail 2 with the adapter rail element 30 shown in FIG. 1b that is placed inside the hollow space 12 of the floor rail 2. Due to the neckings 18 it is placeable into the hollow space 12 through the grid openings 4 and the narrowings 20, respectively and may be displaced there along the x direction. The protrusions 16 always reach out of the floor rail 2 from the interior space 12.

In FIG. 3 the adapter rail element 30 is displaced about half a grid opening in x direction, such that the protrusions 16 are placed directly in the narrowings 20. In a particularly advantageous design the width of the protrusions 16 is equal to the opening clearance of the narrowings 20, such that a very precise positioning transverse to the x direction is accomplished. Then, removing the adapter rail element 30 from the floor rail 2 is not possible any more, since the neckings 18 are not flush with the narrowings 20 anymore and resultantly both projections 15 and 17 provide a stop for the adapter rail element 30. As a result, the adapter rail element 30 can neither be moved in y nor in z direction, which is perpendicular to the x and y axis.

FIG. 4 shows an additional arresting in x direction through arranging a plurality of arresting elements 23 between adjacent protrusions 16, wherein the arresting elements 23 are designed in a way that their exemplarily straight end edges are in a surface contact with the protrusions 16. Due to this reason the protrusions are furthermore designed as squares in the x-y plane. As explained above also other shapes are possible, as long as they correspond to the end edges 28.

Figure 5:
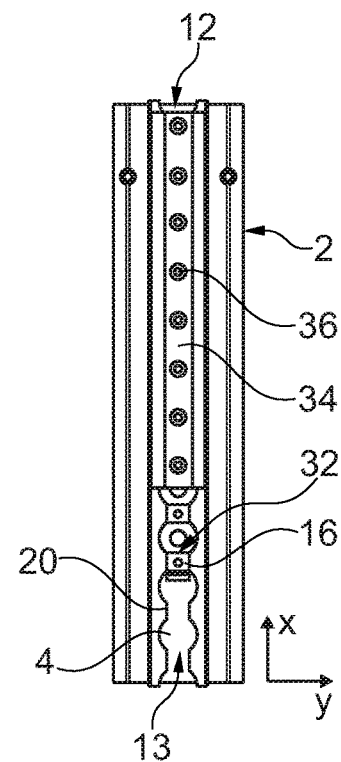
FIG. 5 shows the combination of FIG. 4 and a movement rail element mounted thereon.
Figure 6:
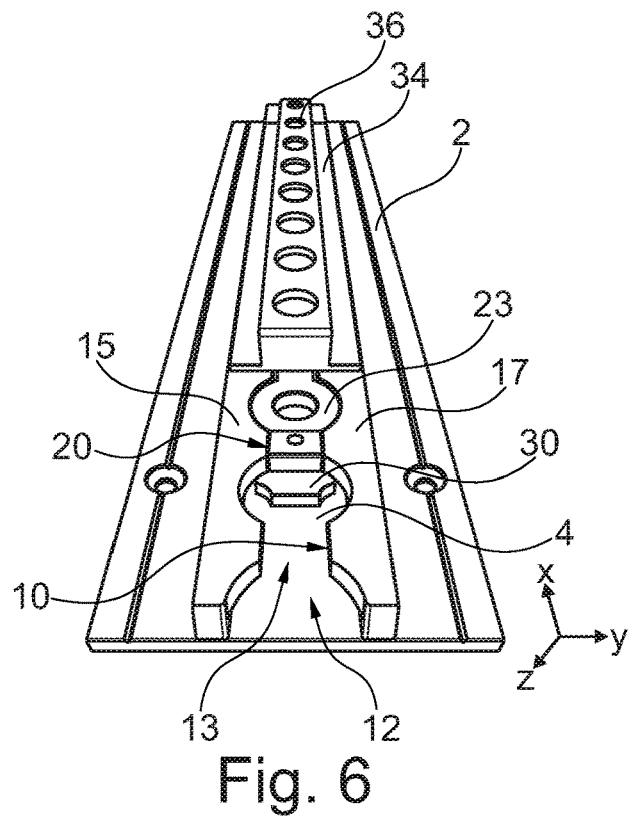
FIG. 6 shows the elements of FIG. 5 in a spatial view.

The protrusions 16 may exemplarily comprise fastening boreholes 32, into which fastening screws are screwable, which in turn are couplable with the movement rail element 34. Exemplarily in FIG. 5 a movement rail element 34 is shown, which comprises fastening boreholes 36, which are to be arranged flush with the boreholes 32 of the protrusions 16. When these boreholes are penetrated by fastening screws, the movement rail element 34 is pressed onto the upper side of the floor rail 2, while the adapter rail element 30 is pressed against the floor rail 2 from underneath. Resultantly, in addition to the form fit in y and z direction a form fit in x direction is achieved, since the arresting element 23 is held between the adapter rail element 30 and the movement rail element 34 within the opening contour 10. As a result, the object, i.e. the movement rail element 34, is fixedly connected with the floor rail 2. Passenger seats or similar objects may be movably mounted on the movement rail element 34 through a slider (not shown). Arresting the position of the slider may be realized through latching of arresting means in the boreholes 36. The main components of the illustration in FIG. 5 are shown in FIG. 6 in a spatial view for further clarification.

Figure 7A:
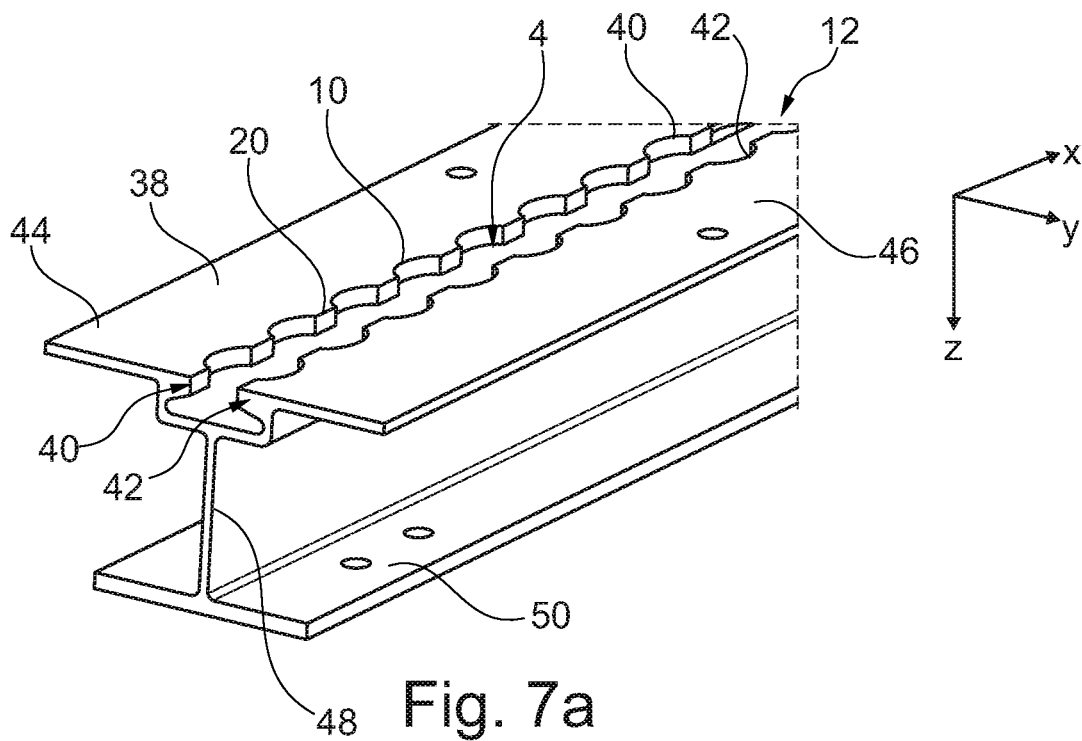
FIGS. 7a to 7c show another exemplary embodiment of an adapter rail system in spatial views (FIGS. 7a and 7b) as well as in a side view (FIG. 7c).

FIG. 7a shows a floor rail 38 having the same opening contour 10 with several grid openings 4 as the rail shown in the previous figures. A hollow space 12 is created between two projections 40 and 42, which are located opposite and at a distance to each other. Two flanges 44 and 46 connect to the projections 40 and 42 in a lateral outward region, such that an exemplarily flat upper surface is created on the floor rail 38. The floor rail 38 therefore differs from the floor rail 2 of the previous figures that it may be arranged in a cabin floor without creating a step therein.

Figure 7B:
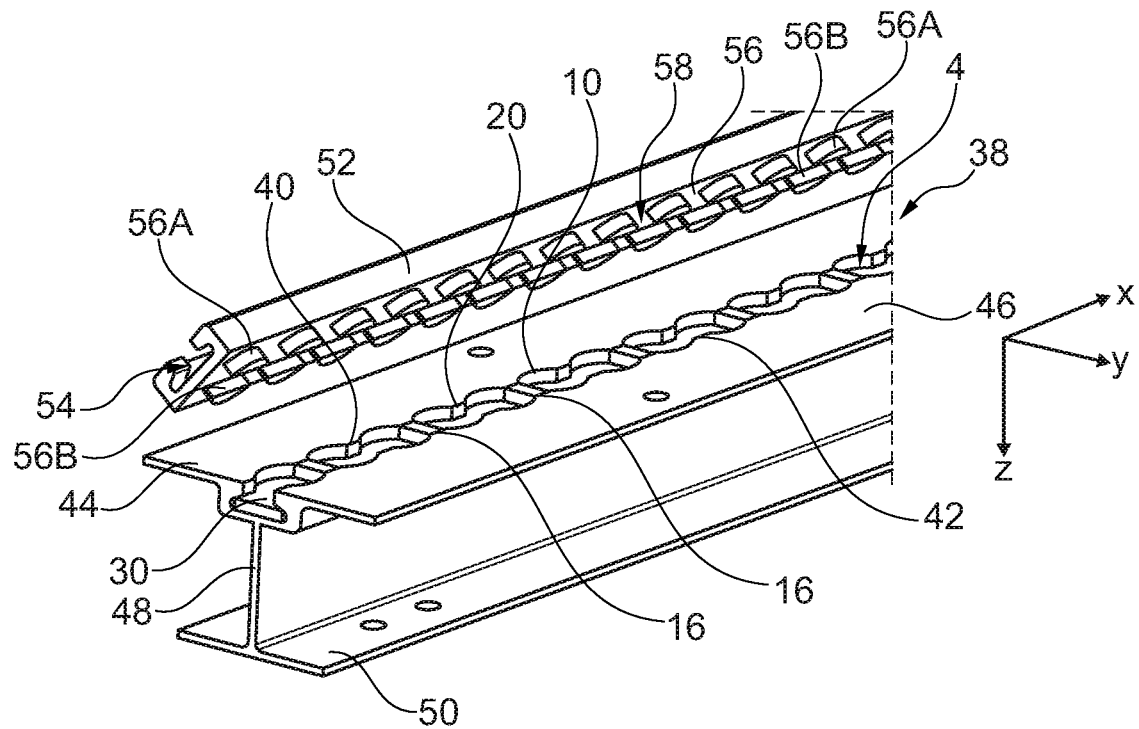

In FIG. 7b the adapter rail element 30 previously shown is inserted into the hollow space 12. Again, protrusions 16 reach through the opening contour 10 of the floor rail 38 and allow fastening of a movement rail element 52.

The movement rail element 52 in turn comprises an elongate shape with a profile that comprises a hollow space 54 and lateral undercuts. The hollow space may 54 allow to insert a slider or any other device, which may be guided in a sliding manner inside the hollow space 54. At an underside 58 of the movement rail element 52, several pairs of arresting bodies 56A and 56B are placed. One pair may resemble the shape of a flat disc, which is penetrated by a slit. Hence, the arresting bodies 56A and 56B are crescent-shaped or lunate, respectively, i.e. both comprise the shape of a segment of a common circle and are arranged diametrically opposed. Hence, they provide a form-fit locking of the movement rail element 52 on the floor rail 38.

When the adapter rail element 30 is positioned inside the hollow space 12 of the floor rail 38 with the protrusions 16 positioned correctly, the movement rail element 52 may be mechanically connected to the adapter rail element 30 through screws or other fastening means. Consequently, the movement rail element 52 is reliably clamped to the floor wail 38 and is additionally secured by engaging the opening contour 10 of the floor rail 38 through the arresting elements 56.

Figure 7C:
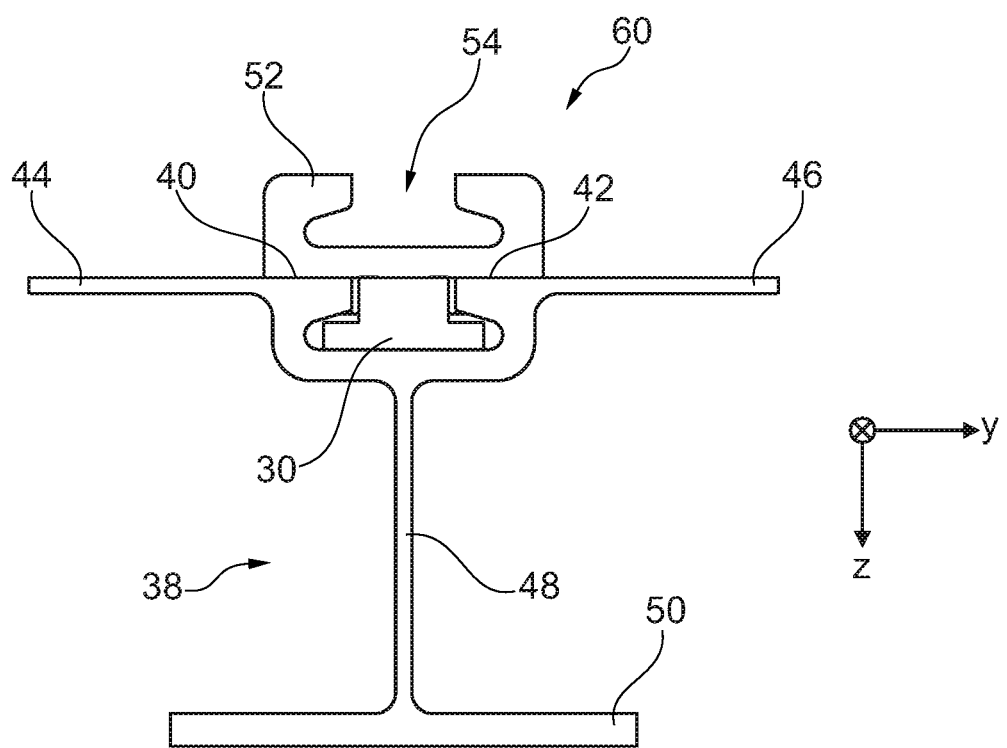

FIG. 7c shows the combination of the floor rail 38, the adapter rail element 30 and the movement rail element 52 in a side view.

Figure 8A:
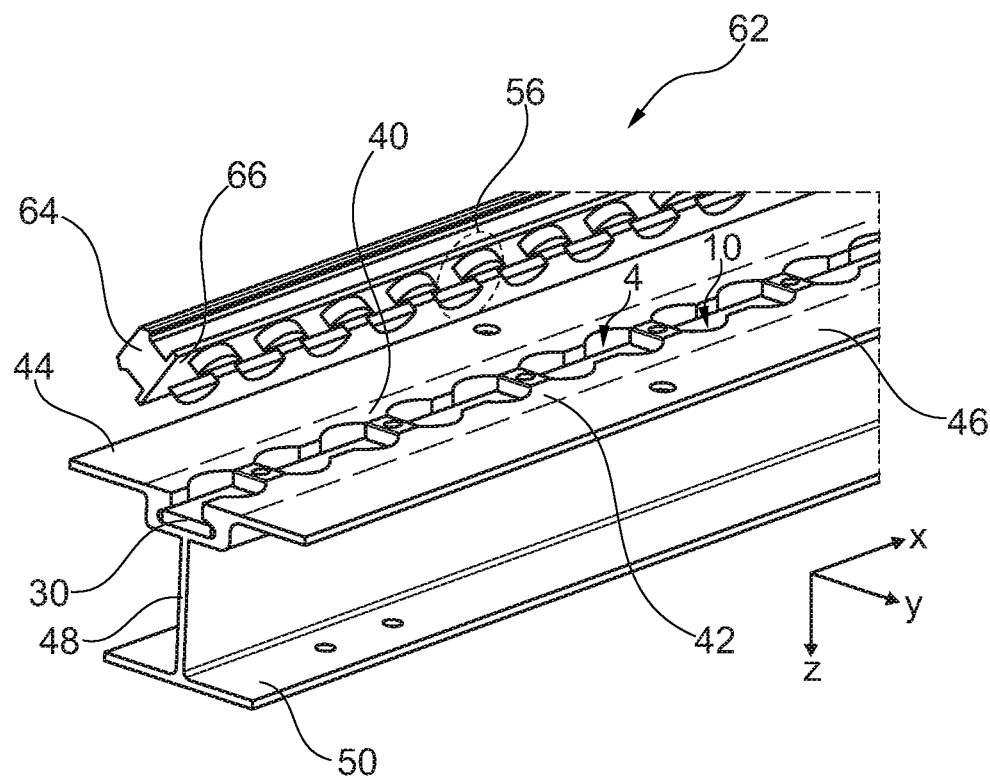
FIGS. 8a and 8b show a still further exemplary embodiment of an adapter rail system in a spatial view (FIG. 8a) and in a side view (FIG. 8b).
Figure 8B:
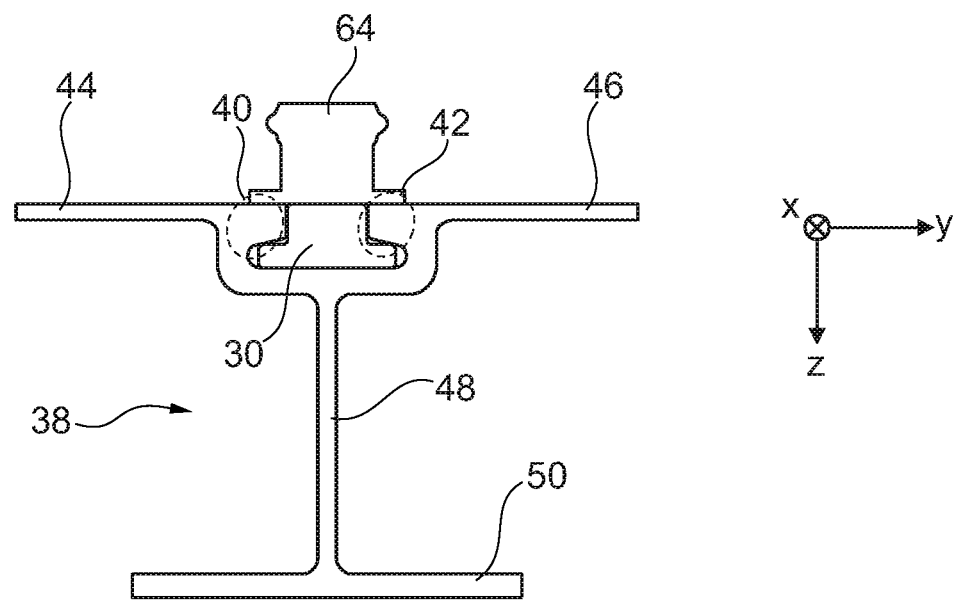

FIGS. 8a and 8b show another exemplary embodiment of an adapter rail system 62, which slightly differs from FIGS.

7a to 7c in that a different movement rail element 64 is used. The movement rail element 64 is very similar to the movement rail element 36 of e.g. FIG. 5. However, at an underside 66 the same arresting elements 56 as shown in FIG. 7b are used.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An adapter rail system for mounting objects to floor rails in a vehicle, the adapter rail system comprising:
    a floor rail comprising an opening contour with comprising consecutively arranged grid openings penetrated by a slit;
    an elongate adapter rail element comprising:
        a surface contour having regularly and consecutively arranged neckings and widenings, the surface contour corresponding to the opening contour of the floor rail; and
        a plurality of protrusions that extend substantially perpendicular to a plane spanned up by the surface contour, wherein the protrusions are arranged in regions corresponding to the widenings of the surface contour;
    an arresting element comprising:
        a base surface that is shaped and adapted to correspond to at least one of the grid openings of the opening contour of the floor rail; and
        two end edges located opposite each other, the two end edges contactable with respective surfaces of two adjacent protrusions of the plurality of protrusions;
        the arresting element dimensioned and shaped to be placed onto the adapter rail element when the adapter rail element is displaced within the floor rail from an insertion position to a lock position, such that each of the two end edges of the arresting element is flushly positioned against one of the plurality of protrusions of the adapter rail element; and
    a movement rail element comprising a plurality of boreholes, the movement rail element configured to connect with the plurality of protrusions of the adapter rail element so as to hold the arresting element between the movement rail element and the elongate adapter rail element without the use of additional fasteners.

2. The adapter rail system according to claim 1, wherein the adapter rail element comprises a length, which corresponds to at least three of the consecutively arranged grid openings of the floor rail.

3. The adapter rail system according to claim 1, wherein the adapter rail element comprises a length, which corresponds to between three and twenty-five of the consecutively arranged grid openings of the floor rail.

4. The adapter rail system according to claim 1, wherein each of the plurality of protrusions comprises a width, which is substantially equal to the width of the slit in the floor rail.

5. The adapter rail system according to claim 1, wherein the arresting element is fixedly arranged on an underside of the movement rail element.

6. The adapter rail system according to claim 5, wherein the arresting element is realized as at least one pair of arresting bodies having a base surface in the form of a segment of a circle.

7. The adapter rail system of claim 1, wherein the floor rail comprises a flat upper receiving surface, which is penetrated by the grid openings and the slit.

* * * * *